US008910755B2

(12) United States Patent
Baumgartner et al.

(10) Patent No.: US 8,910,755 B2
(45) Date of Patent: Dec. 16, 2014

(54) SELF-ENERGIZING DISC BRAKE AND BRAKE PAD FOR THE SAME

(75) Inventors: Johann Baumgartner, Moosburg (DE); Robert Gruber, Pfaffing (DE); Aleksandar Pericevic, Munich (DE); Steffen Geissler, Rodgau (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 162 days.

(21) Appl. No.: 12/981,710

(22) Filed: Dec. 30, 2010

(65) Prior Publication Data

US 2011/0155519 A1 Jun. 30, 2011

Related U.S. Application Data

(63) Continuation of application No. PCT/EP2009/004863, filed on Jul. 6, 2009.

(30) Foreign Application Priority Data

Jul. 4, 2008 (DE) .......................... 10 2008 031 442

(51) Int. Cl.
| | |
|---|---|
| *F16D 55/14* | (2006.01) |
| *F16D 65/18* | (2006.01) |
| *F16D 65/00* | (2006.01) |
| *F16D 55/225* | (2006.01) |
| *F16D 65/095* | (2006.01) |
| *F16D 65/56* | (2006.01) |
| *F16D 55/00* | (2006.01) |
| *F16D 125/58* | (2012.01) |
| *F16D 121/14* | (2012.01) |
| *F16D 127/10* | (2012.01) |

(52) U.S. Cl.
CPC .............. *F16D 65/18* (2013.01); *F16D 65/183* (2013.01); *F16D 2125/587* (2013.01); *F16D 2121/14* (2013.01); *F16D 65/0025* (2013.01); *F16D 55/225* (2013.01); *F16D 65/095* (2013.01); *F16D 65/568* (2013.01); *F16D 2127/10* (2013.01)

USPC ...................... 188/72.2; 188/72.9; 188/73.1

(58) Field of Classification Search
USPC ......... 188/72.1, 72.2, 72.3, 72.7, 72.9, 73.31, 188/73.1
See application file for complete search history.

(56) References Cited

U.S. PATENT DOCUMENTS 2,245,988 A * 6/1941 Lambert ....................... 188/72.2
2,655,228 A * 10/1953 Eksergian .................... 188/72.2
(Continued)

FOREIGN PATENT DOCUMENTS

| DE | 10 2005 015 108 A1 | 10/2006 |
|---|---|---|
| DE | 10 2006 029 942 A1 | 8/2007 |

(Continued)

OTHER PUBLICATIONS

International Search Report dated Dec. 14, 2009, including English translation (10 pages).

(Continued)

*Primary Examiner* — Melody Burch
(74) *Attorney, Agent, or Firm* — Crowell & Moring LLP

(57) ABSTRACT

A self-energizing disc brake includes a brake caliper held on a fixed brake carrier, an active-side and a reaction-side brake pad, which may be pressed against a brake disc, an actuating device with a self-energizing device and an adjuster device for compensating pad and/or disc wear. The self-energizing device has at least one pressure ram, in contact on the front face with the active-side pad by way of a split bearing and fixed by the end thereof facing the brake pad to a guide plate movably held in the brake carrier, designed such that the split bearing is enclosed by a seal arrangement when the self-energizing device is in a non-functioning state.

16 Claims, 1 Drawing Sheet

(56) References Cited

U.S. PATENT DOCUMENTS

| | | | |
|---|---|---|---|
| 2,888,102 A * | 5/1959 | Eksergian et al. | 188/71.9 |
| 3,491,423 A * | 1/1970 | Haller | 384/491 |
| 3,604,682 A * | 9/1971 | Richards | 251/362 |
| 3,636,792 A * | 1/1972 | Vigh | 74/461 |
| 3,800,920 A * | 4/1974 | Warwick | 188/106 F |
| 3,919,448 A * | 11/1975 | Dufresne | 428/157 |
| 3,952,843 A | 4/1976 | Campbell et al. | |
| 4,346,792 A * | 8/1982 | Watanabe | 188/73.32 |
| 4,480,721 A * | 11/1984 | Murphy | 188/52 |
| 7,815,021 B2 | 10/2010 | Baumgartner et al. | |
| 2004/0065509 A1* | 4/2004 | Brozovic | 184/1.5 |
| 2005/0067233 A1* | 3/2005 | Nilsson et al. | 188/158 |
| 2005/0109566 A1* | 5/2005 | Baumann et al. | 188/71.8 |
| 2008/0264737 A1 | 10/2008 | Baumgartner | |
| 2009/0188761 A1 | 7/2009 | Baumgartner et al. | |
| 2009/0194377 A1 | 8/2009 | Baumgartner et al. | |

FOREIGN PATENT DOCUMENTS

| | | | |
|---|---|---|---|
| DE | 10 2006 029 943 A1 | | 10/2007 |
| DE | 10 2006 036 278 B3 | | 10/2007 |
| FR | 2568959 A | * | 2/1986 |
| WO | WO 03/071150 A1 | | 8/2003 |
| WO | WO-2004102023 A1 | * | 11/2004 |
| WO | WO 2005/028905 A1 | | 3/2005 |
| WO | WO 2007/059895 A1 | | 5/2007 |
| WO | WO 2008/014927 A1 | | 2/2008 |

OTHER PUBLICATIONS

German Office Action dated Jun. 26, 2009, including English translation (six (6) pages).

European Search Report dated Apr. 27, 2011 with English translation (eleven (11) pages).

Braun et al., Fachbuch Metall [Technical Book Metal], 42781 Haan-Gruiten : Europa-Lehrmittel, Nourney, Vollmer GmbH & Co., 1999, ISBN: 3-8085-1153-2, pp. 382, 383.

Notification of Opposition dated Aug. 27, 2013 w/ English translation (twelve (12) pages).

* cited by examiner

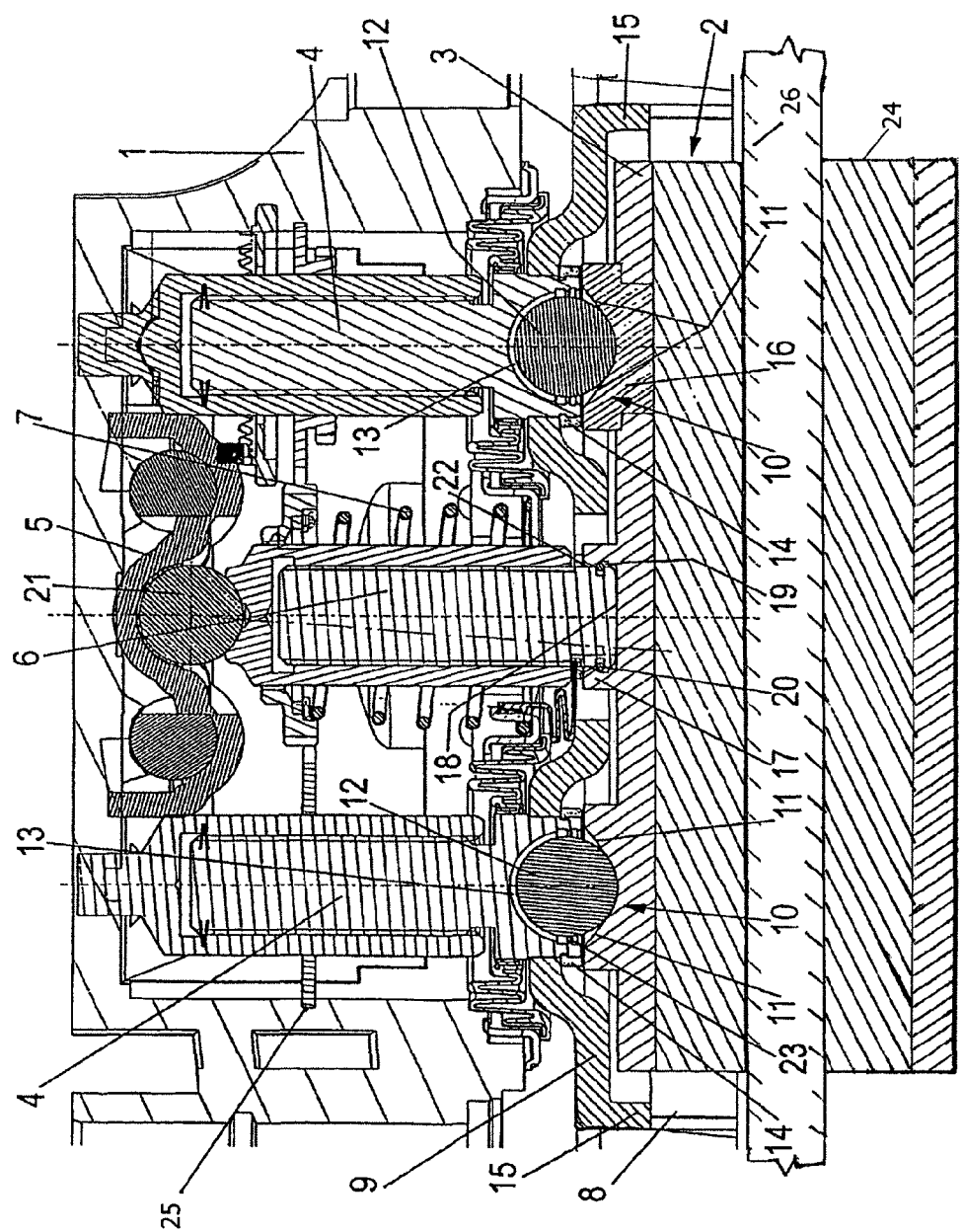

SELF-ENERGIZING DISC BRAKE AND BRAKE PAD FOR THE SAME

CROSS-REFERENCE TO RELATED APPLICATIONS

This application is a continuation of PCT International Application No. PCT/EP2009/004863, filed Jul. 6, 2009, which claims priority under 35 U.S.C. §119 from German Patent Application No. DE 10 2008 031 442.0, filed Jul. 4, 2008, the entire disclosures of which are herein expressly incorporated by reference.

BACKGROUND AND SUMMARY OF THE INVENTION

The invention relates to a self-energizing disc brake and a brake pad therefore.

Self-energizing disc brakes, as are disclosed, for example, in DE 10 2006 036 278 B3, use the tangential forces acting on the brake pad during braking for assisting the brake application force, which is applied by an electromechanical drive or a pneumatically actuated brake cylinder via a brake application device. As a result, the drive may be dimensioned to be considerably smaller.

This self-energizing action is achieved by a self-energizing device which is a component of the brake application device.

In this case, pressure rams which are movable in the axial direction relative to the brake disc are fastened in a guide plate. The pressure rams in each case form a split bearing in cooperation with the brake pad on the brake application side, generally a brake pad having a pad carrier plate which carries a friction pad or a pad pressure plate as a component of the brake pad. Each pressure ram on the front face includes a bearing ball, which is located in a recess provided with ramps sloping upwardly from the inside to the outside in the peripheral direction of the brake disc.

During braking, i.e. when the brake pad is pressed against the brake disc by means of the brake application device, the brake pad is moved due to the friction forces which are produced when coming into contact with the brake disc in the rotational direction thereof, at the same time the associated ramp being moved along the bearing ball, reinforcing the axially aligned braking force which acts on the brake disc.

When releasing the brake, the brake pad is brought into an initial position in which the split bearing is practically ineffective by way of a restoring spring.

During operation, however, problems are produced as the split bearing is substantially unprotected and subjected to the effects of the weather and the environment. This so-called open operation of the split bearing leads to considerable soiling and the appearance of corrosion which may result in the complete failure of the self-energizing device, or at least a reduction in the functionality thereof.

The object of the invention is to develop a self-energizing disc brake and/or a brake pad so that its functional reliability is permanently improved and its service life increased.

This and other objects are achieved by a self-energizing disc brake, comprising a caliper held on a fixed brake carrier, a brake pad on the brake application side and a brake pad on the reaction side, which brake pads may be pressed against a brake disc. A brake application device comprises a self-energizing device as well as a brake ram which may be actuated via a rotary lever and attached to a pad pressure plate, as well as an adjusting device for carrying out adjustments as a result of brake pad wear and/or brake disc wear. The self-energizing device includes at least one pressure ram which bears on its front face against the brake pad on the brake application side via a split bearing and which is secured by its end region facing the brake pad in a guide plate movably held in the brake carrier. The split bearing is enclosed by a sealing arrangement in the non-functioning position of the self-energizing device.

By the enclosure of the split bearing in the unactuated position of the brake, i.e. if, for example, the bearing ball lies in the deepest end position in the recess of the pad pressure plate, the split bearing is protected from the effects of the weather and the operation of the vehicle to such an extent that no moisture or dirt is able to penetrate.

In this case, the surfaces of the pressure ram facing one another and the pad pressure plate bear sealingly against one another in the common coverage region, by the restoring spring, with which the brake pad is pulled out of its braking position, pressing the pad pressure plate and/or the brake pad against the pressure ram. In this case, the front face of the pressure ram and the bearing surface of the pad pressure plate form the sealing arrangement.

For compensating tolerances, preferably on the pressure ram a sealing ring may be provided which, in the initial position of the self-energizing device, bears sealingly against the pad pressure plate and/or the brake pad.

In order to satisfy the mechanical and, in particular, the thermal requirements, the sealing ring is produced from a temperature-resistant, but plasticizable material. To this end, the sealing ring may consist of copper or a temperature-resistant plastics material.

For further corrosion protection, according to an aspect of the invention, the rolling bodies of the split bearing, i.e. generally the bearing balls, are produced from a rust-free and wear-resistant material. To this end, for example, hardenable Cr-alloyed and Ni-alloyed steels, hard metals or ceramics are suitable.

Plain bearing shells, in which the rolling bodies are mounted, may be made from non-rusting or galvanized sheet steel.

The present invention further provides a brake pad for a disc brake, in particular a brake pad for a self-energizing disc brake, comprising a pad pressure plate which carries a friction pad and which has one or both of the following features a) and b): a) at least one recess with a ramp contour formed on the pad pressure plate or on a further plate which may be attached to the pad pressure plate on the side remote from the friction pad, b) the pad pressure plate or the further plate has on the side remote from the friction pad a projection with a receptacle in which a brake ram may be held.

In this manner, further functions are directly incorporated in the brake pad and namely, on the one hand, the at least one ramp contour for the rolling body and alternatively—or particularly preferably additionally—the retention of at least one brake ram. Preferably, the projection is a projection for the middle ram of a total of three brake rams.

According to an advantageous development of the brake pad according to the invention, the ramps of the split bearing are incorporated into a separate insert, which is connected to the pad pressure plate and/or the pad carrier plate, for example by welding.

Alternatively, the ramps may be designed integrally with the pad pressure plate, and may be provided to be sufficiently wear-resistant and corrosion-resistant by appropriate post-treatment. This is integral design may be implemented in a particularly cost-effective and space-saving manner. Moreover, this embodiment provides a guarantee that the corresponding components of the split bearing are not able to be reused when replacing the brake pad.

A trough-shaped design of the guide plate forms a protection of the split bearing from the effects of the weather, primarily from sprayed water acting during the operation of the vehicle, the brake pad and/or the pad pressure plate, in terms of their depth, being partially located in this trough.

The trough edge protrudes, therefore, laterally over the brake pad, whereby in cooperation with a cup-like design of the guide plate in the region of the receiver of the pressure ram, a labyrinth-type seal is formed, which is also effective during braking, i.e. when the brake pad is spaced apart from the pressure ram and/or the guide plate by means of the split bearing and the seal between the pressure ram and the pad pressure plate as a result of the sealing arrangement is no longer as great. By the trough-shaped design of the guide plate, sprayed water and splashed water may not penetrate directly into the gap formed between the guide plate and the pad pressure plate.

In addition or alternatively, as protection of the split bearing, a corresponding seal may be fastened to the respective bearing ball which is designed so that it outwardly seals, firstly, the recess comprising the ramps and, secondly, the bearing region in the pressure ram, i.e. the aforementioned bearing shell.

Other objects, advantages and novel features of the present invention will become apparent from the following detailed description of one or more preferred embodiments when considered in conjunction with the accompanying drawing.

BRIEF DESCRIPTION OF THE DRAWING

The sole FIGURE is a sectional plan view showing a partial detail of an exemplary disc brake according to the invention.

DETAILED DESCRIPTION OF THE DRAWING

In the FIGURE, a self-energizing disc brake is shown, which includes a brake caliper 1 held on a fixed brake carrier 8, a brake pad 2 on a brake application side and a brake pad on the reaction side 24 (shown schematically), which brake pads may be pressed against a brake disc 26. In the example, only the brake pad 2 on the brake application side is shown.

A brake application device is a rotary lever type, and includes a brake ram 6. Via the brake application device, the brake pad 2 may be moved in the axial direction relative to the rotational axis of the brake disc by a rotation of the lever 5 about an axis perpendicular to the brake disc axis.

Furthermore, a self-energizing device is provided, which has the split bearing 10, with which a pressure ram 4 is associated in each case. The pressure rams 4 are engaged with an adjusting device 25 for adjusting the position of the brake pad 2 on account of wear.

The pressure rams 4 are held at their end region facing the brake pad 2 in a guide plate 9. The pressure rams are able to be displaced in the brake application direction in the brake carrier 8.

Each split bearing 10 has a bearing ball 12 incorporated in the associated pressure ram 4 on the front face thereof and positioned therein in a plain bearing shell 13. Outside of the bearing shell 13, the bearing ball is located in a spherical cap-shaped recess, the side wall thereof being formed in the sense of upwardly sloping ramps 11.

When braking, i.e. when by means of the rotary lever 5 the brake pad 2 is pressed against the brake disc, tangential forces are produced by which the brake pad 2 is displaced in the rotational direction of the brake disc, altering the spacing of the brake pad 2 relative to the pressure ram 4.

When releasing the brake, the brake pad 2 is moved back by a restoring spring 7 into a so-called relaxed initial position, in which the bearing ball 12 rests in the recess of the brake pad 2 practically without function. In this position, which may be seen in the FIGURE, the pressure ram 4 and a pad pressure plate 3 of the brake pad 2 bear sealingly against one another, including the split bearing 10.

In the example, for tolerance compensation, at the end of the pressure ram 4 facing the pad pressure plate 3, a sealing ring 14 is arranged, which preferably consists of a temperature-resistant, plasticizable material and which bears sealingly against the associated surface of the pad pressure plate 3.

Alternatively or in addition, as in the example, a sealing ring 23 is arranged on the bearing ball 12 with which the plain bearing shell 13 and the split bearing 10 are sealed relative to the environment.

For incorporating the recess with the ramps 11, the recess, as shown in the example on the left-hand side, may be configured integrally with the pad pressure plate 3. Alternatively, the recess may be in a separate insert 16, which is fixedly connected to the pad pressure plate 3.

In the region of the pressure rams 4, the guide plate 9 has a convex projection (oriented opposite the brake pad 2), while on its side facing the brake pad 2 the guide plate 9 is provided with a peripheral trough edge 15 which defines a trough-shaped recess, in which the brake pad 2 and/or the pad pressure plate 3 are partially located.

By way of the trough edge 15, it is effectively prevented that even in the case of the brake pad 2 being forced apart by the pressure ram 4 during braking, the gap formed between the guide plate 9 and the pad pressure plate 3 is covered in a manner in which it is protected from water spray.

The brake ram 6 is held by its associated end region in a receptacle 18 provided with an undercut 19, so that during transverse displacement of the brake pad 2 caused by braking, a deflection is possible. A ball 21, by which the brake ram 6 is supported on the rotary brake lever 5, functions as a pivot bearing.

The receptacle 18 is arranged in an integrally formed projection 17 of the pad pressure plate 3, with a funnel-shaped insertion opening 22 through which the brake ram 6 may be inserted.

A resilient ring 20 is arranged in a peripheral groove of the brake ram 6, for the axial securing thereof. The ring 20 is forced into the receptacle 18 when the brake ram 6 is inserted and after insertion is forced open and comes to bear against the undercut 19.

| Table of Reference Numerals | |
|---|---|
| 1 | Brake caliper |
| 2 | Brake pad |
| 3 | Pad pressure plate |
| 4 | Pressure ram |
| 5 | Rotary brake lever |
| 6 | Brake ram |
| 7 | Restoring spring |
| 8 | Brake carrier |
| 9 | Guide plate |
| 10 | Split bearing |
| 11 | Ramp |
| 12 | Bearing ball |
| 13 | Plain bearing shell |
| 14 | Sealing ring |
| 15 | Trough edge |
| 16 | Insert |
| 17 | Projection |
| 18 | Receiver |

| Table of Reference Numerals | |
|---|---|
| 19 | Undercut |
| 20 | Ring |
| 21 | Ball |
| 22 | Insertion opening |
| 23 | Sealing ring |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self-energizing disc brake having a brake disc and fixed brake carrier, the self-energizing disc brake comprising:
   a caliper;
   an application-side brake pad having a pad pressure plate;
   a reaction-side brake pad, the brake pads being pressable against the brake disc;
   a brake application device comprising a rotary lever, a brake ram, a self-energizing mechanism, and a wear adjustment device, the brake ram coupling with the pad pressure plate and being actuatable via the rotary lever;
   wherein the self-energizing mechanism comprises at least one pressure ram having a front face that bears against the application-side brake pad via a split bearing, an end region of the at least one pressure ram facing the application-side brake pad being secured in a guide plate movably held in the brake carrier; and
   a sealing arrangement operatively configured to enclose the split bearing in an essentially non-functioning position of the self-energizing mechanism, wherein the sealing arrangement comprises a sealing ring arranged around a bearing ball located on a front face of the brake ram in a plain bearing shell of the split bearing.

2. The self-energizing disc brake according to claim 1, wherein the sealing arrangement is formed by the front face of the pressure ram bearing sealingly against the application-side brake pad.

3. The self-energizing disc brake according to claim 1, wherein the sealing ring is fastened at the end region of the pressure ram facing the application-side brake pad, the sealing ring bearing against the application-side brake pad.

4. The self-energizing disc brake according to claim 2, wherein the sealing ring is fastened at the end region of the pressure ram facing the application-side brake pad, the sealing ring bearing against the application-side brake pad.

5. The self-energizing disc brake according to claim 3, wherein the sealing ring comprises a temperature-resistant, plasticizable material.

6. The self-energizing disc brake according to claim 3, wherein the sealing ring comprises one of a copper material and a temperature-resistant plastic material.

7. The self-energizing disc brake according to claim 1, wherein the split bearing comprises components formed of a corrosion and wear-resistant material.

8. The self-energizing disc brake according to claim 1, wherein the bearing ball comprises at least one of a hardenable chrome/nickel-steel, a hard metal, and a ceramic material.

9. The self-energizing disc brake according to claim 8, wherein the self-energizing mechanism further comprises:
   an insert having a receptacle for the bearing ball, the insert being connected to the pad pressure plate of the application-side brake pad; and
   wherein the receptacle comprises a recess having side surfaces formed as upwardly sloping ramps.

10. The self-energizing disc brake according to claim 8, wherein the self-energizing mechanism further comprises:
    a receptacle for receiving the bearing ball, the receptacle being incorporated in the pad pressure plate of the application-side brake pad.

11. The self-energizing disc brake according to claim 1, wherein the guide plate comprises a trough edge operatively configured to cover an entire gap between the guide plate and the brake pad in a spread-apart functional position of the split bearing.

12. The self-energizing disc brake according to claim 1, wherein the pad pressure plate comprises a projection having a receptacle to which the brake ram is coupled.

13. The self-energizing disc brake according to claim 12, wherein the receptacle comprises an undercut into which a ring of the brake ram is engageable.

14. The self-energizing disc brake according to claim 13, wherein the ring is a resilient ring.

15. The self-energizing disc brake according to claim 13, wherein the receptacle has a funnel-shaped insertion opening for receiving the brake ram.

16. The self-energizing disc brake according to claim 14, wherein the resilient ring is arranged to be radially movable in a peripheral groove of the brake ram.

* * * * *